United States Patent [19]
Cordon et al.

[11] 3,904,747
[45] Sept. 9, 1975

[54] DENTIFRICE COMPOSITIONS

[75] Inventors: Martin Cordon, Highland Park; James Norfleet, Plainfield, both of N.J.

[73] Assignee: Colgate-Palmolive Company, New York, N.Y.

[22] Filed: July 20, 1972

[21] Appl. No.: 273,489

Related U.S. Application Data

[63] Continuation-in-part of Ser. No. 109,596, Jan. 25, 1971, abandoned.

[52] U.S. Cl. .................................................. 424/49
[51] Int. Cl.$^2$............................................. A61K 7/16
[58] Field of Search ................................ 424/49–59

[56] References Cited
UNITED STATES PATENTS

| | | | |
|---|---|---|---|
| 2,130,034 | 9/1938 | Schmidt........................... | 424/54 |
| 3,070,510 | 12/1962 | Cooley et al...................... | 424/49 |
| 3,574,823 | 4/1971 | Roberts et al. ................... | 424/49 |
| 3,662,059 | 5/1972 | Wiesner et al..................... | 424/52 |
| 3,666,855 | 5/1972 | Muhler .............................. | 424/52 |

*Primary Examiner*—Richard L. Huff
*Attorney, Agent, or Firm*—R. L. Stone; H. S. Sylvester; M. M. Grill

[57] ABSTRACT

A dentifrice composition containing zirconium silicate as the cleaning and polishing agent and a thermoplastic resin such as polyvinyl chloride to impart the desired visual and physical appearance of a dentifrice. The dentifrice may also advantageously contain a fluoride-containing anticaries agent.

5 Claims, No Drawings

DENTIFRICE COMPOSITIONS

This application is a continuation-in-part of Ser. No. 109,596, filed Jan. 25, 1971, now abandoned.

This invention relates to a dentifrice preparation containing zirconium silicate as the cleaning and polishing agent and a thermoplastic resin to impart the visual and physical appearance of a dentifrice.

It is known in the art that zirconium silicate may be advantageously used in prophylatic dental paste compositions as the cleaning and polishing agent. However, prior to the instant invention no dentifrice for normal daily use was known which could utilize small but substantial amounts of zirconium silicate as the cleaning and polishing agent. It was widely believed that zirconium silicate was much too hard and abrasive to be formulated into a dentifrice designed for normal daily dental hygiene. In U.S. Pat. No. 3,450,813, it was taught to use various amounts of a particular grade of zirconium silicate. When small amounts were used, an additional cleaning and polishing material was present.

In the instant invention, advantageously with particles of zirconium silicate and particles of a thermoplastic resin, we have formulated a dentifrice having excellent cleaning and polishing characteristics which causes negligible damage to dental hard tissues and enamel. Moreover, we have found that anticariogenic fluoride-containing compounds may be added to the instant dentifrice compositions without the less of effectiveness often found with conventional dentifrice cleaning and polishing agents.

Accordingly, it is an advantage of this invention to provide a dentifrice containing an effective amount of zirconium silicate as the cleaning and polishing agent.

Another advantage of the present invention is to provide a dentrifice which cleans and polishes teeth effectively.

A further advantage of the present invention is to provide a dentifrice which contains a stable fluoride anticariogenic agent.

A still further advantage of the present invention is to provide a dentifrice composition characterized by a novel combination of zirconium silicate and thermoplastic resin.

These and other advantages, objects and features of the instant invention will be hereinafter described in detail.

In accordance with certain of its aspects, this invention relates to a dentifrice composition containing particles of zirconium silicate in an amount up to about 10 percent by weight effective to clean and polish dental enamel. Typically about 0.5–10 percent, preferably about 1 to 5 percent and most preferably about 2 to 5 percent and about 20 to about 50 percent by weight of particles of a thermoplastic resin. The zirconium silicate particles typically range up to about 10 microns in diameter size, preferably up to about 5 microns, and have an average mean diameter of about 0.3 to 1 micron. Less than 0.5 percent of zirconium silicate is also effective.

The particles of zirconium silicate are prepared substantially free of adhesion to particles of other materials and remain substantially free of such adhesion upon incorporation into a dentifrice.

A particularly desirable grade of zirconium silicate is characterized in that 99 percent of the particles are finer than 2.50 microns; 95 percent are finer than 2.15 microns; 90 percent are finer than 1.77 microns; 80 percent are finer than 1.25 microns and 50 percent are finer than 0.52 microns.

The preparation of suitable particle size zirconium silicate can be accomplished by conventional techniques well known to the art. Basically, these techniques involve milling zirconium silicate ore, followed by standard screen sieving (or air separation) to segregate the desired particle size. The zirconium silicate of the present invention may be prepared by a ball milling technique in which a cylindrical or conical shell rotates on a horizontal axis which is charged with a grinding medium such as balls of steel, flint, or porcelain. The grinding is accomplished by the tumbling action of the ball on the material to be ground. Particles of zirconium silicate which are ball milled have relatively smooth surfaces and good cleaning and polishing action.

Zirconium silicate particles may also be prepared by hammer milling. Hammer mills utilize a high speed rotary shaft having a plurality of hammers or beaters mounted thereon. The hammers may be T-shaped elements, bars or rings fixed or pivoted to the shaft or to discs pivoted to the shaft. The shaft runs in a housing containing grinding plates or liners. The grinding action results from the impact between the material being milled and the moving hammers. When zirconium silicate is milled by an attrition technique such as hammer milling, relatively rough, jagged particles are produced which have good cleaning and polishing action. Mixtures of ball and hammer milled zirconium silicate may also be advantageously used in this invention.

The resins useful in the compositions of this invention include the broad class of synthetic resins classifiable as thermoplastic. They include such resins as the polyolefines, such as polyethylene and polypropylene; polyvinyl chloride; copolymers of chloride and vinyl alcohol, vinyl acetate or vinylidene chloride; polymethyl methacrylate; polyethyl methacrylate; polyisopropyl methacrylate; polyisobutyl methacrylate; polystyrene, polymethyl styrene; natural and synthetic rubbers, such as styrenebutadiene copolymers; polyamides, such as nylon; polyacrylates; cellulosics, such as acetates and butyrates; polycarbonates; acetals, such as polymers of formaldehyde; phenoxys, such as polymers of bis-phenol-A and epichlorohydrin; polymers of monomers containing at least 2 polymerisable groups such as polyallyl methacrylate and the polymers of the diesters of methacrylic acid and ethylene glycol; and mixtures of said resins.

The thermoplastic resins of this invention may be prepared by suspension, bulk, and emulsion polymerisation methods which are well known in the art.

The thermoplastic resins typically have an average molecular weight of about 10,000 to about 500,000, preferably about 10,000 to about 100,000 and a mean diameter of less than 50 microns. The mean diameter is desirably from about 0.5 to 50 microns and preferably from about 15 to 25 microns for optimum performance. The thermoplastic resin is desirably present in an amount of from about 20 to about 50 percent by weight of the total composition, and preferably from about 30 to about 45 percent.

The thermoplastic resins may be prepared in bulk and reduced to the desired size by grinding methods well known in the art.

The particles of thermoplastic resin are prepared substantially free of adhesion to particles of other materials and remain substantially free of such adhesion upon incorporation into a dentifrice.

The thermoplastic resin successfully imparts the visual and physical appearance of a dentifrice to the compositiotn without substantially affecting, that is decreasing or increasing, the cleaning and polishing characteristics. The substantial lack of polish effect and little cleaning effect of the thermoplastic resin is supported by disclosures in Canadian Pat. No. 856,221; U.S. Pat. No. 3,070,510; U.S. Pat. No. 3,151,027 and Larson, "The Swedish Dental Federation Journal", Volume 61, No. 2, (1969) Pages 58–65 (particularly Page 64).

It is quite surprising that the ability of the dentifrice of the invention to remove stain and to polish teeth in substantially as satisfactory as if a comparable amount of zirconium silicate were present with an additional cleaning and polishing agent, such that the dentifrice would include at least 20 percent by weight of cleaning and polishing agent.

The visual and physical characteristics of a dentifrice imparted by the thermoplastic resin are recognizable when a toothpaste is formed. Its cosmetic and rheological characteristics, including pastiness, viscosity, slight tackiness and easy extrudibility are all highly desirable.

The novel dentifrice of the invention provides normal daily hygenic effectiveness with negligible deleterious effect on dental enamel and dentine.

As previously indicated the instant dentifrice compositions may contain a fluoride-containing anticaries agent. There are many water-soluble inorganic salts which are suitable sources of fluoride ions. Among these are sodium, potassium, ammonium, indium, palladium, ferrous, and lithium fluoride. The monofluorophosphate salts are also useful and include $Na_4P_3O_9F$, $K_4P_3O_9F$, $(NH_4)_4P_3O_9F$, $Na_3KP_3O_9F$, $(NH_4)_3NaP_3O_9F$, and $Li_4P_3O_9F$. Complex water-soluble fluoride-containing salts such as fluorosilicate (i.e., $Na_2SiF_6$), fluorozirconate (i.e., $Na_2ZrF_6$, $SnZrF_6$; $CaZrF_6$), fluorostannite (i.e., $KSnF_3$), fluoroborate (i.e., $NaBF_4$), fluorotitanate (i.e., $NaTiF_5$), and fluorogermanate (i.e., $K_2GeF_6$) may also be used. Mixed halides such as $SnClF$ and $Sn_2ClF_3$ are also useful. The fluoride ion may also be supplied by an organic fluoride which yields fluoride ions in water. Suitable organic compounds include mono-, di-, and triethanolamine hydrofluoride. These materials are present in an effective but non-toxic amount, usually within the range to provide about 0.01 to 1 percent by weight of the water-soluble fluorine content thereof to the dentifrice. Sodium fluoride, stannous fluoride, and sodium monofluorophosphate are the preferred compounds.

As herein before indicated these anticariogenic fluorine-containing compounds show no loss of effectiveness often found with conventional dentifrice cleaning and polishing agents.

The essential ingredients of the dentifrices of this invention may be compounded in a number of cosmetically acceptable forms. For example, they may be compounded as a powder or as a paste.

In the preparation of toothpowders it is usually sufficient to admix mechanically the various solid ingredients in appropriate quantities and particle sizes.

In dental cream formulations the liquids and solids should necessarily be proportioned to form a creamy mass of desired consistency which is extrudable from an aerosol container or a collapsible tube (for example, aluminum or lead). In general, the liquids in the dental cream will comprise chiefly water, glycerine, aqueous solutions of sorbitol, propylene glycol, polyethylene glycol 400, etc. including suitable mixtures thereof. It is advantageous usually to use a mixture of both water and a humectant or binder such as glycerine or sorbitol. The total liquid content will generally be about 20 to 75 percent by weight of the formulation. It is preferred to use also a gelling agent in dental creams such as the natural and synthetic gums and gum-like materials, for example, Irish moss, gum tragacanth, methyl cellulose, hydroxyethyl cellulose, sodium carboxymethyl cellulose, polyvinylpyrrolidone, and starch, usually in an amount up to about 10 percent, and preferably about 0.2 to 5 percent of the formulation. It is preferred to use gelling agents which are most compatible with fluoride ions such as methyl cellulose and hydroxyethyl cellulose.

Organic surface-active agents are used in the compositions of the present invention to assist in achieving thorough and complete dispersion of the instant compositions throughout the oral cavity and render them more cosmetically acceptable. The organic surface-active material may be anionic, nonionic, ampholytic, or cationic in nature, and it is preferred to employ as the surface-active agent a detersive material which imparts to the composition detersive and foaming properties. Suitable such detergents are water-soluble salts of higher fatty acid monoglyceride monosulfates, such as the sodium salt of the monosulfated monoglyceride of hydrogenated coconut oil fatty acids, higher alkyl sulfates, such as sodium lauryl sulfate, olefin, sulfonates, such as those containing 8 to 25 carbon atoms, alkyl aryl sulfonates, such as sodium dodecyl benzene sulfonate, higher alkyl sulfoacetates, higher fatty acid ester of 1,2 dihydroxy propane sulfonates, and the substantially saturated higher aliphatic acyl amides of lower aliphatic amino carboxylic acid compounds, such as those having 12 to 16 carbon atoms in the fatty acid, alkyl, or acyl radicals, and the like. Examples of the last mentioned amides are N-lauroyl sarcosine, and the sodium, potassium, and ethanolamine salts of N-lauroyl, M-myristoyl, or N-palmitoyl sarcosine which should be substantially free from soap or similar higher fatty acid material which tends to substantially reduce the effect of these compounds. The use of these sarcosinate compounds in dentifrice compositions of the present invention is particularly advantageous since these materials exhibit a prolonged and marked effect in the inhibition of acid formation in the oral cavity due to carbohydrate breakdown in addition to exerting some reduction in the solubility of tooth enamel in acid solutions. Another preferred material is a long chain fatty acid sodium coconut monoglyceride sulfonate used alone or in combination with sodium lauryl sulfate.

Other particularly suitable surface-active materials include nonionic agents such as condensates of sorbitan monostearate with approximately 60 moles of ethylene oxide, condensates of ethylene oxide with propylene oxide condensates of propylene glycol (available under the trademark "Pluronics") and amphoteric agents such as quaternized imidazole derivatives which are available under the trademark "Miranol" such as Miranol $C_2M$. Cationic surface-active germicides and antibacterial compounds may also be used. Such compounds include di-isobutylphenoxyethoxyethyl dimethyl benzyl ammonium chloride, benzyl dimethyl stearyl ammonium chloride, tertiary amines, having one fatty alkyl group (of from 12 to 18 carbon atoms) and two (poly)oxyethylene groups attached to the nitrogen (typically containing a total of from about 2 to 50 ethenoxy groups per molecule) and salts thereof with acids, and compounds of the structure:

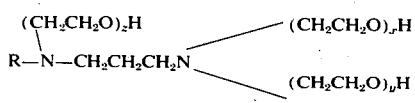

where R is a fatty alkyl group containing from about 12 to 18 carbon atoms, and $x$, $y$, and $z$ total 3 or higher, as well as salts thereof with mineral or organic acids. It is preferred to use from about 0.05 to 5 percent by weight of the foregoing surface active materials in the instant dentifrice preparations.

In accordance with certain additional aspects of this invention, cationic antibacterial agents are included in the compositions of the present invention. Such agents include:

$N^1$-(4-chlorobenzyl)-$N^5$-(2,4-dichlorobenzyl)biguanide
p-chlorophenyl biguanide
4-chlorobenzhydryl biguanide;
4-chlorobenzhydrylguanylurea;
N-3-lauroxypropyl-$N^5$-p-chlorobenzylbiguanide;
1,6-di-p-chlorophenylbiguanidohexane;
1-(lauryldimethylammonium)-8-(p-chlorobenzyldimethylammonium) octane dichloride;
5,6-dichloro-2-guanidinobenzimidazole;
$N^1$-p-chlorophenyl-$N^5$-laurylbiguanide;
5-amino-1,3-bis (2-ethylhexyl)-5-methylhexahydropyrimidine and their non-toxic acid addition salts, particularly the fluorides and the dihydrogen fluorides. 1,6-di-(p-chlorophenylbiguanidohexane) is particularly preferred. These agents may be used in amounts ranging from about 0.01 to 5 percent and preferably about 0.05 percent to 1.0 percent by weight of the dentifrice.

Any suitable flavoring or sweetening materials may be employed in formulating a flavor for the compositions of the present invention. Examples of suitable flavoring constituents include the flavoring oils, for example, oils of spearmint, peppermint, wintergreen, sassafras, clove, sage, eucalyptus, marjoram, cinnamon, lemon, and orange, as well as sodium methylsalicylate. Suitable sweetening agents include sucrose, lactose, maltose, sorbitol, sodium cyclamate, perillartine, and saccharine. Suitably, flavor and sweetening agent together comprise from about 0.01 to 5 percent or more of the compositions of the instant invention.

Various other materials may be incorporated into the dentifrice preparations of this invention. Examples thereof are coloring and whitening agents, preservatives, silicones, chlorophyll compounds, ammoniated materials such as urea, diammoniumphosphate, and mixtures thereof, and other constituents. These adjuvants are incorporated in the instant compositions in amounts which do not substantially adversely affect the properties and characteristics desired and are selected and used in proper amount depending upon the particular type of preparation involved.

In addition to the embodiment of the invention as set out earlier in which zirconium silicate is the cleaning and polishing agent, there may also, however, not of necessity, be present additional conventional cleaning and polishing agents. Such agents include calcium pyrophosphate, calcium hydrogen phosphate dihydrate, anhydrous calcium hydrogen phosphate, insoluble sodium metaphosphate, calcium carbonate, calcium hydrogen phosphate dihydrate/anhydrous calcium hydrogen phosphate, talcs [$Mg_3Si_4O_{10}(OH)_2$] containing at least a minor amount of tremolite [$CaMg_3(SiO_3)_4$], hydrated alumina, magnesium carbonate, magnesium orthophosphate, natural and synthetic silica, tricalcium phosphate, calcium sulfate, etc. The substantially water-impervious, cross-linked, thermosetting, highly-polymerized synthetic resins described in U.S. Pat. No. 3,450,813 (e.g., melamine formaldehyde resins) may also be included in the compositions of this invention. These conventional cleaning and polishing agents may be typically present in an amount of from about 10 to about 50 percent by weight of the zirconium silicate without affecting the highly desirable characteristics of the instant dentifrices.

It is desirable to adjust the pH of the dentifrice compositions to a range of about 3 to 9 using such acids as citric, acetic, chloropropionic, malonic, formic, fumaric, methoxyacetic, and propionic. Lower pH's than 3 are undesirable for oral use and lead to hydrolysis and corrosion problems. When stannous ions are present, the pH should be lower than about 5. The preferred pH range is 3.5 to about 5.0 when stannous ions are present and about 4.5 to about 7.0 in the absence of stannous ions.

The compositions of the invention are prepared in the conventional manner. The toothpastes are formed by incorporating particles of zirconium silicate and of the thermoplastic resin into a gel formed by adding a pre-mix of gelling agent, such as sodium carboxymethyl cellulose, sodium benzoate and sodium saccharine to a humectant, such as glycerine, to which water is then added. The particles of zirconium silicate and of thermoplastic resin are mixed into the gel under agitation at room temperature and remain substantially individual units in the finished toothpaste. Detergent and flavor and other ingredients are added, as desired.

The following specific examples are further illustrative of the present invention, but it is understood that the invention is not limited thereto. All amounts and proportions are by weight unless otherwise indicated.

EXAMPLE 1

|  | Percent by Weight |
|---|---|
| Glycerine | 22.0 |
| Water | 28.5 |
| Polyvinyl chloride | 40.0 |
| Zirconium silicate | 5.0 |
| Sodium carboxymethylcellulose | 1.0 |
| Sodium benzoate | 0.5 |
| Sodium lauryl sulfate | 2.0 |
| Sodium saccharine | 0.2 |
| Flavor | 0.8 |

The toothpaste of Example 1 has excellent cleaning and polishing characteristics, good visual and physical appearance, and is not unduly abrasive. The zirconium silicate used in this and the following Examples have a mean diameter of about 0.5 micron and the instant polyvinyl chloride a mean diameter of about 15 microns and an inherent viscosity of 1.15.

More specifically, the grade of zirconium silicate employed has a particle size distribution such that 99 percent of the particles are finer than 2.50 microns and 50 percent are finer than 0.52 microns; the particles of polyvinyl chloride employed are available from Goodyear Tire and Rubber Co. as "Pliovic" M-90.

EXAMPLE 2

| | Percent by weight |
|---|---|
| Glycerine | 22.00 |
| Water | 28.24 |
| Polyvinyl chloride | 43.00 |
| Zirconium silicate | 2.00 |
| Sodium carboxymethylcellulose | 1.00 |
| Sodium benzoate | 0.50 |
| Sodium lauryl sulfate | 1.50 |
| Sodium saccharine | 0.20 |
| Sodium monofluorophosphate | 0.76 |
| Flavor | 0.80 |

The anticariogenic toothpaste of Example 2 has excellent cleaning and polishing characteristics, good physical and visual appearance, is not unduly abrasive and the fluoride anticaries agent was stable after aging for 9 weeks at 120°F.

EXAMPLE 3

The following toothpaste is prepared which has excellent cleaning and polishing characteristics, and is cosmetically acceptable, and not unduly abrasive:

| | Percent by weight |
|---|---|
| Glycerine | 22.0 |
| Water | 28.5 |
| Polyvinyl chloride | 43.0 |
| Zirconium silicate | 2.0 |
| Sodium carboxymethylcellulose | 0.9 |
| Sodium N-laureyl sarcosinate | 2.0 |
| Sodium saccharine | 0.2 |
| 1,6-di-(p-chlorophenyl-biguanidohexane) diacetate | 0.6 |
| Flavor | 0.8 |

EXAMPLE 4

The following toothpaste is prepared which has excellent cleaning and polishing characteristics and is cosmetically acceptable, and not unduly abrasive:

| | Percent by Weight |
|---|---|
| Glycerine | 22.0 |
| Water | 18.5 |
| Polyvinylchloride | 45.0 |
| Zirconium silicate | 10.0 |
| Sodium carboxymethylcellulose | 1.0 |
| Sodium benzoate | 0.5 |
| Sodium lauryl sulfate | 2.0 |
| Sodium saccharine | 0.2 |
| Flavor | 0.8 |

In laboratory evaluations as illustrated in Example 5 below, to determine the efficacy of the novel combination of zirconium silicate and a thermoplastic resin, comparative tests as to enamel cleaning, and enamel polishing were made. Dentin abrasion tests were also made on Toothpaste A of Example 5 in a procedure based on the Grabenstetter et al, J.Den. Res., 37 P. 1060 (1958). The radioactive dentin value was 114 units, which is significantly lower than typical values determined in the same manner for conventional toothpastes. In the enamel cleaning and polishing evaluations the instant combination of zirconium silicate-polyvinyl chloride had a higher percent stain removal and also a significantly higher polish recovery than the conventionally used commercial abrasives. Therefore, it is clearly evident that in comparison with cleaning and polishing agents currently being used the combination of zirconium silicate and a thermoplastic resin is far superior since it abrades to a lesser degree and cleans and polishes more effectively.

EXAMPLE 5

The following toothpastes were prepared:

| | Percent by Weight | | | |
|---|---|---|---|---|
| | A | B | C | D |
| Glycerine | 22.0 | 22.0 | 22.0 | 22.0 |
| Water | 28.5 | 28.24 | 29.5 | 30.65 |
| Polyvinyl chloride thermoplastic resin | 40.0 | 43.00 | 43.0 | 43.0 |
| Zirconium silicate | 5.0 | 2.00 | 1.0 | 0.1 |
| Sodium carboxymethyl cellulose | 1.0 | 1.00 | 1.0 | 0.85 |
| Sodium benzoate | 0.5 | 0.50 | 0.5 | 0.5 |
| Sodium lauryl sulfate | 2.0 | 1.50 | 2.0 | 1.5 |
| Sodium saccharine | 0.2 | 0.20 | 0.2 | 0.2 |
| Sodium monofluorophosphate | — | 0.76 | — | — |
| Flavor | 0.8 | 0.80 | 0.8 | 0.8 |

The particle size of zirconium silicate employed in Toothpastes, A, B, C and D corresponded to that indicated in Example 1.

Each of these compositions had the cosmetic appearance of a toothpaste.

The ability of Dentifrices A, B, C and D to remove stains and clean human dental enamel was determined in the following way: sections of human dental enamel were etched with 0.1 N HCl for 2 minutes, rinsed with water, then wet with a dilute solution of stannous fluoride, wiped dry, and finally exposed to a stream of hydrogen sulfide gas which resulted in the deposition of a brown deposit of stannous sulfide. The amount of stain on the surface was measured with a Gardner Automatic Color Difference meter. The surface was then brushed with a mechanical brushing maching for 3000 reciprocal strokes with a slurry of a dentifrice and the residual stain measured with a meter. Finally, the stain which remained was completely removed with dental pumice and the reflectance of this surface was read. The ability of a dentifrice to remove the stain is expressed by Equation 1.

$$\text{(Eq. 1)} \quad \text{Percent Stain Removed} = \frac{(R_D 3000 \text{ strokes} - R_D \text{ initial})}{R_D \text{ pumiced} - R_D \text{ initial}} \, 100$$

Where $R_D$ initial, $R_D$ 3000 strokes, and $R_D$ pumiced are respectively the reflectance values measured on the initially stained surface, after brushing for 3000 reciprocal strokes and after removing the residual stain with pumice.

In the Table below, the stain removal values for dentifrices A, B, C and D are given.

TABLE

| Dentifrice | Percent Stain Removal |
|---|---|
| A | 78 |
| B | 66 |
| C | 44 |
| D | 42 |

For purposes of comparison, a slurry of 50 percent by weight of polyvinyl chloride in water was subjected to the same test. The stain removal percentage was only 28 percent.

Thus, it was observed that even at levels of zirconium silicate as low as 0.5 percent significantly effective stain removal and cleaning of dental enamel occurs compared with the poor cleaning effect contributed by polyvinyl chloride. Indeed, from the data, it was apparent that even amounts of zirconium silicate less than 0.5 percent would be effective. Commercial dentifrices generally remove above 30 percent of the stain, as is the case with Dentifrices A, B, C and D.

The ability of Dentifrices A, B, C and D to polish dental enamel was determined in the following way:

Sections of human dental enamel upon which have been ground flat areas, were first polished, then dulled with chalk, and then brushed with a slurry of a dentifrice for 5000 reciprocal strokes. A "Monsanto Tooth Reflectance Instrument" was employed to measure the specular reflectance of the polished surface after each step described above. The dulled surface was adjusted so that it was approximately 150 units (Monsanto Instrument) lower than the polished surface. The polishing ability of the dentifrice was expressed by Equation 2.

(Eq. 2)
$$\text{Percent Polish Recovery} = \frac{SR_{5000}\text{strokes} - SR_{dulled}}{SR_{polished} - SR_{dulled}}$$

Where $SR_{polished}$, $SR_{dulled}$ and $SR_{5000}$ strokes are respectively the specular reflectance values of the enamel surface after the initial polishings, after dulling with chalk, and after brushing with a dentifrice slurry.

In the Table below polish recovery values for dentifrices A, B, C and D are given:

TABLE

| Dentifrices | Percent Polish Recovery |
|---|---|
| A | 69 |
| B | 41 |
| C | 50 |
| D | 46 |

For purposes of comparison, a slurry of 50 percent by weight of polyvinyl chloride was subjected to the same test. There was no measurable polish recovery with this formulation.

Thus, it was observed that even at low levels of zirconium silicate, excellent polish recovery, on a level comparable and above many commercial dentifrices, was obtained and that the polyvinyl chloride contributed no substantial polishing effect. Further, from the data, it was apparent that even amounts of zirconium silicate less than 0.5 percent would be effective.

EXAMPLE 6

The compatibility of fluoride-containing anticaries agent, such as sodium monofluorophosphate, in a dentifrice containing both zirconium silicate and thermoplastic resin was determined in a test on Dentifrice B of Example 5. The dentifrice was stored for several weeks at 120°F and the percentage of monofluorophosphate ion as fluoride ion was determined initially in the Table below:

TABLE

| Weeks | Percent Monofluorophosphate as Fluoride |
|---|---|
| Initial | 95 |
| 3 | 81 |
| 6 | 77 |
| 9 | 64 |

Thus, it was observed that fluoride-containing anticaries agent, such as sodium monofluorophosphate, was compatible with a dentifrice containing zirconium silicate and thermoplastic resin such as polyvinyl chloride.

It is apparent that the above examples illustrate the invention and various modifications may be made thereto.

What is claimed is:

1. A dentifrice preparation comprising about 20 to about 50 percent by weight of particles of polyvinyl chloride and up to about 15 percent by weight of a cleaning and polishing material which cleaning and polishing material consists of (1) uncoated zirconium silicate having a particle size range up to 10 microns and (2) a second cleaning and polishing material which does not affect the desirable properties of the dentifrice; the zirconium silicate being present in an amount effective to clean and polish dental enamel up to about 10 percent by weight of the dentifrice and constitutes at least two-thirds of said cleaning and polishing material.

2. The dentifrice preparation of claim 1 wherein said zirconium silicate is present in amount of about 1–5 percent by weight of said dentifrice and the mean diameter of said zirconium silicate particles ranges up to 5 microns and the mean diameter of said polyvinyl chloride particles ranges from about 0.5 to about 50 microns.

3. The dentifrice preparation of claim 1 wherein said particles of zirconium silicate and of polyvinyl chloride are in a toothpaste gel vehicle.

4. A dentifrice preparation comprising about 20 to about 50 percent by weight of particles of polyvinyl chloride and an amount of cleaning and polishing material effective to clean and polish dental enamel up to about 10 percent by weight of said dentifrice which cleaning and polishing material consists of uncoated zirconium silicate having a particle size range up to 10 microns.

5. A process of cleaning and polishing dental enamel comprising applying to teeth and dentifrice preparation comprising about 20 to about 50 percent by weight of particles of polyvinyl chloride and up to about 15 percent by weight of a cleaning and polishing material which cleaning and polishing material consists of (1) uncoated zirconium silicate having a particle size range up to 10 microns and (2) a second cleaning and polishing material which does not affect the desirable properties of the dentifrice; the zirconium silicate being present in an amount effective to clean and polish dental enamel up to about 10 percent by weight of the dentifrice and constitutes at least two-thirds of said cleaning and polishing material.

* * * * *